July 21, 1936.　　　H. GONEN ET AL　　　2,048,118

SALT AND PEPPER SHAKER

Filed June 26, 1934

INVENTORS
*Hyman Gonen*
*Isaac Grodsky*
BY *Harold Kaplan*
ATTORNEY

Patented July 21, 1936

2,048,118

UNITED STATES PATENT OFFICE 2,048,118

SALT AND PEPPER SHAKER

Hyman Gonen and Isaac Grodsky, Brooklyn, N. Y.

Application June 26, 1934, Serial No. 732,406

1 Claim. (Cl. 65—45)

Our present invention relates to condiment dispensers, such as salt and pepper shakers and the like.

The principal object of the present invention is to provide a valve-like cap or closure for a salt or pepper container which covers and closes the mouth of the container when it is held in normal upright position, said cap or closure having dispensing apertures therein for the passage of the condiment, which apertures are normally covered and are uncovered only when the container is inverted or tilted from its normal position. Another object of the present invention is to provide a closure for a salt or pepper shaker which will prevent the entrance of dust into the condiment container and which will protect the contents of the container against atmospheric impurities. Another object of the present invention is to provide a closure for a salt or pepper shaker for the aforesaid purposes, which may be easily attached to and removed from the condiment container when refilling and cleaning is required. A still further object of the present invention is to provide a salt or pepper shaker which is simple in construction, inexpensive to manufacture, practical in use and attractive in appearance. Other objects and advantages of the present invention will in part be pointed out hereinafter and will in part be apparent to those skilled in the art to which the present invention relates.

With the above and other objects in view, the present invention consists of the novel construction and arrangement of parts hereinafter described and illustrated in the accompanying drawing forming an integral part of this specification.

In the accompanying drawing, wherein are illustrated certain preferred embodiments of the present invention, Fig. 1 is a sectional elevation of a salt or pepper shaker constructed in accordance with our invention, shown in normal upright position;

Figure 1:
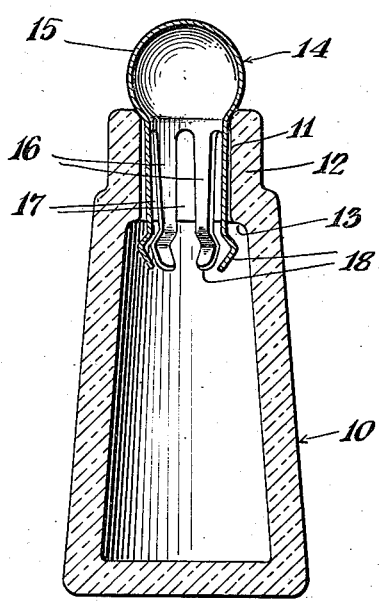

Referring now to the drawing wherein like reference characters indicate corresponding parts throughout the several views, 10 designates the condiment container which is the usual hollow receptacle having a longitudinal passageway 11 at its upper end. The container 10 preferably terminates at its upper end in a neck 12 providing an annular inturned flange 13 on the inner wall of the container 10 between the body and neck of the container; the purpose of which will be described hereinafter. Mounted on the container 10 is a cap or closure member 14 comprising preferably a spherical shaped head 15 and a multiplicity of prongs 16 arranged circumferentially on the head 15 and depending longitudinally therefrom into the passageway 11 in the neck of the condiment container. The head 15 is slightly larger in diameter than the passageway 11 so that the head 15 rests on the marginal edge of the neck 12 when the shaker is in normal upright position, and covers the passageway 11. The circumferential diameter of the prongs 16 is slightly smaller than the diameter of the passageway 11 so that the prongs 16 are in sliding contact with the wall of the opening 11. The prongs 16 are in spaced relationship on the head 15 forming slits 17 therebetween which serve to provide the dispensing apertures for the condiment as hereinafter described. The prongs 16 are preferably slightly longer than the neck 12 and extend slightly below the flange 13. The tips 18 of the prongs 16 are flexed outwardly so that when the shaker is inverted the tips 18 will impinge against the flange 13 thereby preventing the closure member 14 from dropping out of the condiment container and limiting the vertical displacement of the closure member 14 to a predetermined distance.

Figure 2:
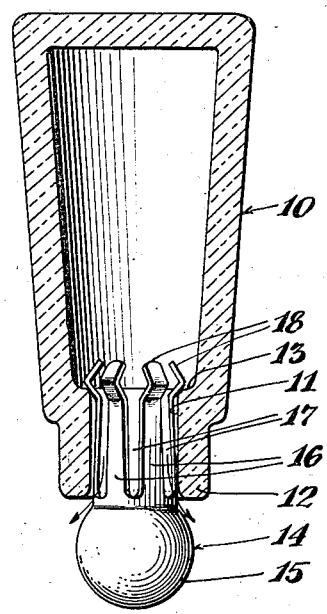
Fig. 2 is a view similar to Fig. 1 showing the salt or pepper shaker in inverted position.
Figure 3:
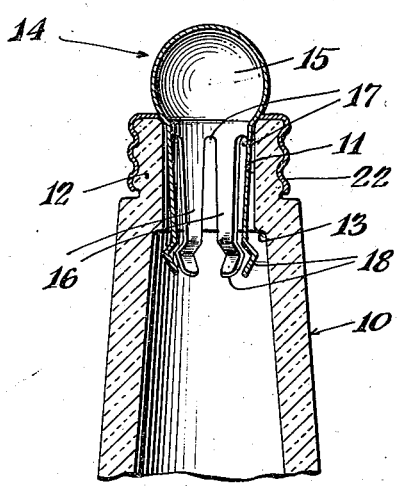
Fig. 3 is a fragmentary sectional elevation of an embodiment of the present invention, showing a metallic cover for the neck of the shaker.
Figure 4:
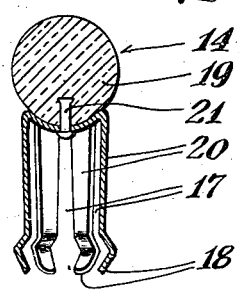
Fig. 4 is a sectional view of a modified form of the closure member of the shaker.

The cap or closure member 14 is preferably made of one piece of metal with the head 15 hollow and the prongs 16 integral with the head as shown in Figs. 1, 2 and 3 of the drawing. However, the construction of the closure member may be varied as illustrated in Fig. 4 to comprise a solid head 19 made of glass or other suitable material, and metallic prongs 20 secured to the head as by a rivet 21. This modification in the construction of the closure member may be resorted to without departing from the principle and scope of the present invention, as essentially the structure is the same. A solid glass head for the closure member may be employed with advantage for ornamental purposes, as for instance when it is desired to have the head of the closure member match with the color or material of the condiment container.

In Fig. 3 of the drawing we have shown the neck 12 of the condiment container provided with a metallic covering 22 which may be threaded or cemented onto the neck of the container. This construction is also ornamental in character and, it is believed, does not change the principle of the present invention. The metallic covering 22 may be employed advantageously with the all-metal closure member to provide a salt or pepper shaker of attractive appearance.

It will be observed in the use of the present device that the closure member 14 may be easily inserted into the passageway 11 in the condiment container by merely pressing the prongs 16 through said passageway; the prongs 16 being of spring-like character yield easily to pressure. In like manner the closure member 14 may be easily removed from engagement with the container by grasping the head 15 with the fingers and pulling the closure member out of the passageway 11. It will, therefore, be apparent that the present device is exceedingly convenient and practical when refilling and cleaning of the condiment dispenser is required.

As will be observed from Fig. 1 of the drawing, wherein our improved device is shown in normal upright position, the head 15 of the closure member rests on the marginal edge of the neck 12 and covers the passageway 11 therein, thus preventing the entrance of dust into the container and protecting the condiment against impurities from the atmosphere. When it is desired to use the shaker to dispense the condiment contained therein, the shaker is inverted as shown in Fig. 2 of the drawing. When that is done, it will be observed that the closure member will be caused to drop slightly and the slits 17 between the prongs 16 will be slightly uncovered thus providing apertures through which the condiment can flow as indicated by the arrows.

Although our present invention is essentially as described hereinabove and illustrated in the accompanying drawing, it is to be understood that we do not intend to limit ourselves to the specific embodiments of our invention as described and illustrated but that slight variations in the details of construction are contemplated which will fall within the scope of our present invention as defined in the appended claim.

Having thus described and illustrated our present invention, what we claim as new and desire to secure by Letters Patent is:

In a salt or pepper shaker, the combination with a container having a longitudinal passageway therein, of a valve-like closure member longitudinally slidable within said passageway, said closure member being formed of a single piece of metal and having a head portion adapted to be normally seated on top of the shaker so as to close the opening therein, and a multiplicity of depending prongs adapted for contraction whereby they may be readily inserted into and withdrawn from the opening, the tips of said prongs being flexed outwardly to provide limiting fingers to prevent accidental displacement of the closure member from the opening, said prongs having spaces therebetween which are normally covered and which are slightly uncovered when the shaker is in use so as to provide dispensing openings for the condiment.

HYMAN GONEN.
ISAAC GRODSKY.